United States Patent [19]
Mason

[11] 3,936,284
[45] Feb. 3, 1976

[54] AIR FILTERING APPARATUS

[75] Inventor: Donald G. Mason, Park Ridge, Ill.

[73] Assignee: Mason Engineering and Designing Corporation, Rosemont, Ill.

[22] Filed: Aug. 16, 1974

[21] Appl. No.: 497,842

[52] U.S. Cl. .................. 55/274; 55/472; 55/485; 55/385 A; 55/486; 55/DIG. 34; 116/70; 116/DIG. 25; 340/239 F; 340/240; 417/313
[51] Int. Cl.² .......................................... B01D 46/10
[58] Field of Search ............. 55/271, 274, 316, 482, 55/485, 486, DIG. 34, 473, 279, 472, 385; 116/114 AD, 70, DIG. 25; 415/54; 417/42, 313; 340/239 F, 240, 241, 236; 200/83 R; 21/74 R

[56] References Cited
UNITED STATES PATENTS

| | | | |
|---|---|---|---|
| 2,065,970 | 12/1936 | Hartzell | 55/473 |
| 2,723,388 | 11/1955 | Jacobs | 340/236 |
| 3,172,743 | 3/1965 | Kowalewski | 55/274 X |
| 3,363,539 | 1/1968 | Taylor et al. | 55/473 X |
| 3,626,545 | 12/1971 | Sparrow | 55/482 X |
| 3,812,370 | 5/1974 | LaViolette | 55/274 X |

Primary Examiner—Frank W. Lutter
Assistant Examiner—David L. Lacey

[57] ABSTRACT

An air filtering apparatus is disclosed utilizing a prefilter at the inlet side and a HEPA type filter at the outlet side. The interior chamber of the apparatus is divided into two subchambers with a blower forceably pumping air from the inlet chamber to the outlet chamber. A first indicator means is responsive to a predetermined decrease in pressure in the inlet chamber for indicating when the prefilter needs changing, and a second indicator means is responsive to a predetermined increase in pressure in the outlet chamber indicating when the HEPA type filter requires changing. A plurality of the apparatuses may be utilized in an air filtering system controlled remotely by radio transmitting and receiving devices.

8 Claims, 3 Drawing Figures

AIR FILTERING APPARATUS

BACKGROUND OF THE INVENTION

This invention relates to an air filtering apparatus of the type which filters from the air not only large particulates, such as street and house dust, but also odors and submicron-size particulates, such as tobacco smoke. The particulates are removed by the apparatus efficiently without the use of electrostatic devices, and thus the apparatus is particularly useful in filtering the air in rooms where the crackling noises from an electrostatic filter and a buildup of ozone in the air might be objectionable.

The air filtering apparatus of this invention utilizes replaceable filter elements, and one of the features of this invention is the provision of means to continuously monitor the condition of each of the filter elements so that the apparatus will automatically signal when the particulates have accumulated on one of the filter elements to such an extent as to require replacement of that element.

In an air filtering apparatus, it is essential that the filter elements be properly maintained in order to assure that the proper quantity of air is passing through the device and in order to assure the filtering quality of the device. Regardless of whether the filtering apparatus is of the electrostatic type or of the replaceable element type, there is a need for periodic maintenance, either by way of cleaning or replacement of those elements. Although an air filter unit may be serviced by cleaning or replacing of the elements at regular intervals of time, this is really not satisfactory or practical, particularly in connection with a replaceable filter element where the cost of unnecessary replacement may make the operation of the apparatus prohibitive in cost. The accumulation of particles on the filter elements depends not only upon the period of time the filter is in operation but also upon the condition of the air passing through the filter. The filter may be completely clogged in a very short time if the air passing through it is particularly dirty; in other instances where the air is relatively clean, the filter may be operated for much longer periods of time without requiring cleaning or changing.

The maintenance and operation problems are multiplied in connection with a filtering apparatus which utilizes a prefilter and a final filter, because two filter elements will usually require servicing at different times. Although, prior to this invention, various devices have been developed to signal when a single filter requires cleaning or changing, no satisfactory means has heretofore been developed for monitoring simultaneously the conditions of filter elements which sequentially filter the air passing through the apparatus.

One of the principal objects of this invention is to provide an integrated signaling device which will monitor both the prefilter and the final filter in an air filtering apparatus, and independently signal when one or the other of these filters has accumulated sufficient particulates from the air to require changing.

Another feature of the invention is the utilization of one or more of the apparatuses in a system which is remotely controlled for monitoring the condition of the filters and for controlling the amount of air flowing through the individual units. This is particular important in an installation where there are a number of air filtering devices in a single room. The air filtering operation may be turned down to a low speed level, or it may be turned up to the high speed, filter-condition monitoring level. The preferred remote control system employs a portable radio transmitter and a switch-operating receiver in the air filtering apparatus. Thus, the individual filters in each of the filtering apparatuses of the system is monitored separately, but simultaneously, by simultaneous remote control of the operation of the several apparatuses of the system from any location within range of the portable transmitter.

In some installations, it may be desirable to have two or more independently operated and controlled systems, each for example in a separate room or area and having one or more separate air filtering apparatuses. In such an installation, if desired, the remote radio control for each system may be tuned to a different frequency, so that there will be no interference or "cross-controlling" among the systems.

SUMMARY OF THE INVENTION

The air filtering apparatus of this invention is adapted to utilize a prefilter and a final filter for filtering air passing through the apparatus. In accordance with one embodiment, the apparatus comprises a chamber having an inlet and an outlet. A first, or prefilter means is disposed across the chamber inlet and a second or final filter means is disposed across the chamber outlet. A dividing means, preferably in the form of a wall, is disposed between the two filter means and divides the chamber into two adjacent subchambers, and this wall has an opening through which air may pass from the first, or inlet, subchamber into the second, or outlet, subchamber. Blower means also disposed between the two filter means is provided for forceably blowing air from the first subchamber into the second subchamber. Thus, the air will be drawn through the first or prefilter means into the first, or inlet, subchamber and then will be forced into the second, or outlet, subchamber and exhausted through the second or final filter means.

The apparatus utilizes two simultaneously operative indicator means. The first indicator means is disposed in the first or inlet subchamber and is responsive to a predetermined decrease in pressure in that subchamber for indicating when the first or prefilter means requires changing. The second indicator means is disposed in the second or outlet subchamber and is responsive to a predetermined increase in pressure in that subchamber for indicating when the second or final filter means requires changing. Thus, the conditions of both the first and second filter means may be simultaneously monitored.

Means may also be provided responsive to a predetermined signal for varying the speed of the blower means between at least two predetermined speed levels, one of which will produce pressure differentials in the subchambers sufficient to actuate the first and second indicator means independently when the corresponding first and second filters require changing.

In the preferred embodiment, the first filter means includes a spun fiberglass mat prefilter panel and an adsorptive charcoal filter panel, and the second filter means is a HEPA type filter panel.

In accordance with one aspect of the preferred embodiment of the invention, the control means for the apparatus preferably includes a remote control means responsive to a predetermined signal altering the speed at which the blower means is operated. This remote control means may comprise a radio frequency receiver, a signal circuit operated by the receiver in response to receipt of a predetermined transmitted frequency, and means for generating that predetermined radio frequency for actuating the radio receiver. Thus, the blower means may be remotely controlled to test the conditions of the first and second filter means. In many installations, it may be desirable to provide a plurality of air filtering apparatuses with the radio receiver of each being responsive to the same predetermined transmitted radio signal, whereby the conditions of the filter means in each of the apparatuses may be simultaneously checked by a single radio frequency generating means.

DETAILED DESCRIPTION OF THE PREFERRED EMBODIMENT

The air filtering apparatus of this invention is adapted to be installed within a room and to draw the room air in through one side of the apparatus and exhaust the filtered clean air out through the other side of the apparatus. In the process of filtering, the apparatus is adapted to remove approximately 95% or more of all particulates 0.3 of a micron in size in the air passing therethrough.

Figure 1:
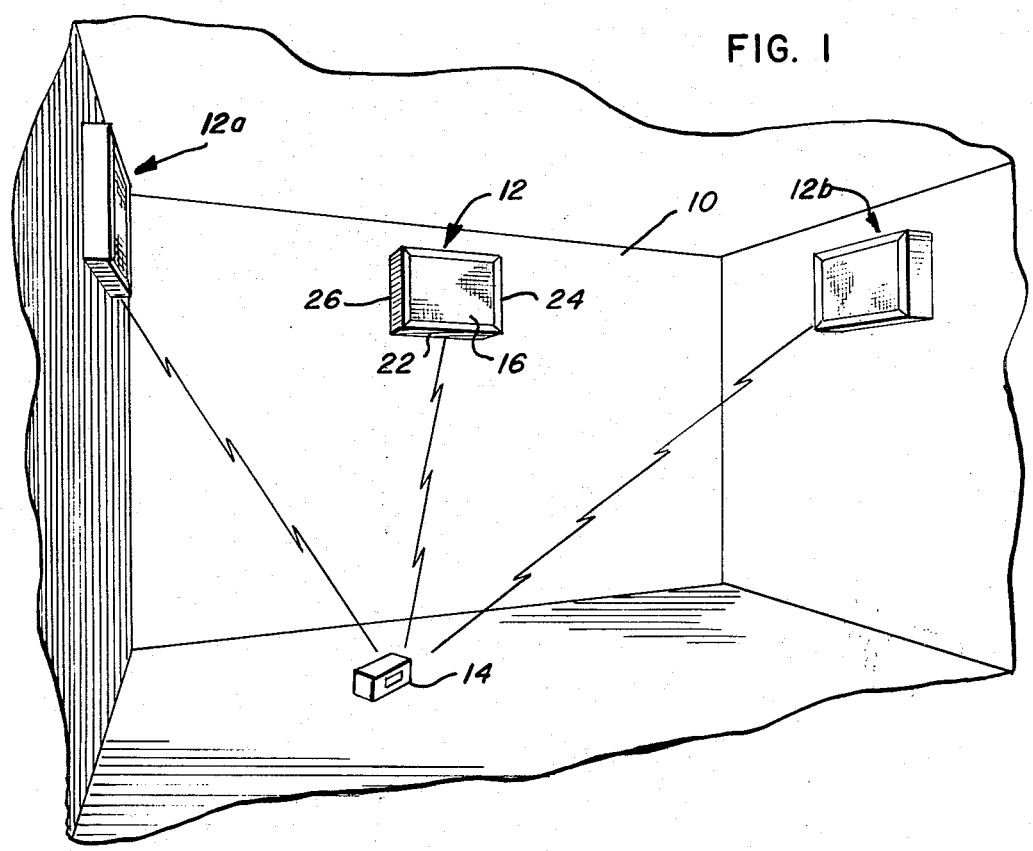
FIG. 1 is a perspective view of a large room wherein there are installed three air filtering apparatuses constructed in accordance with this invention, all three of the apparatuses being operated by means of a single portable remote control device which generates a radio frequency to which all three filtering apparatuses are responsive.

In FIG. 1, there is illustrated a room 10 having an air filtering system consisting of three wall-mounted air filtering apparatuses 12, 12a and 12b, which are controlled by a single radio frequency transmitting control device 14. The installation in FIG. 1, of course, represents but one type of installation to which the apparatus of this invention are adapted. It will be understood, of course, that in many installations only one apparatus will be required in a room, and the installation may be, for example, on the ceiling rather than on a wall. Moreover, even if there are more than one of the apparatuses within a single room, it may be desirable to provide a separate control for each. However, the remote control of a number of the units by a single radio frequency transmitting portable control device 14 provides very convenient control for the air filtering system within a room and also provides an excellent means for instantaneously, simultaneously, and independently checking the conditions of the two filter elements within each of the individual air filtering apparatuses.

Figure 2:
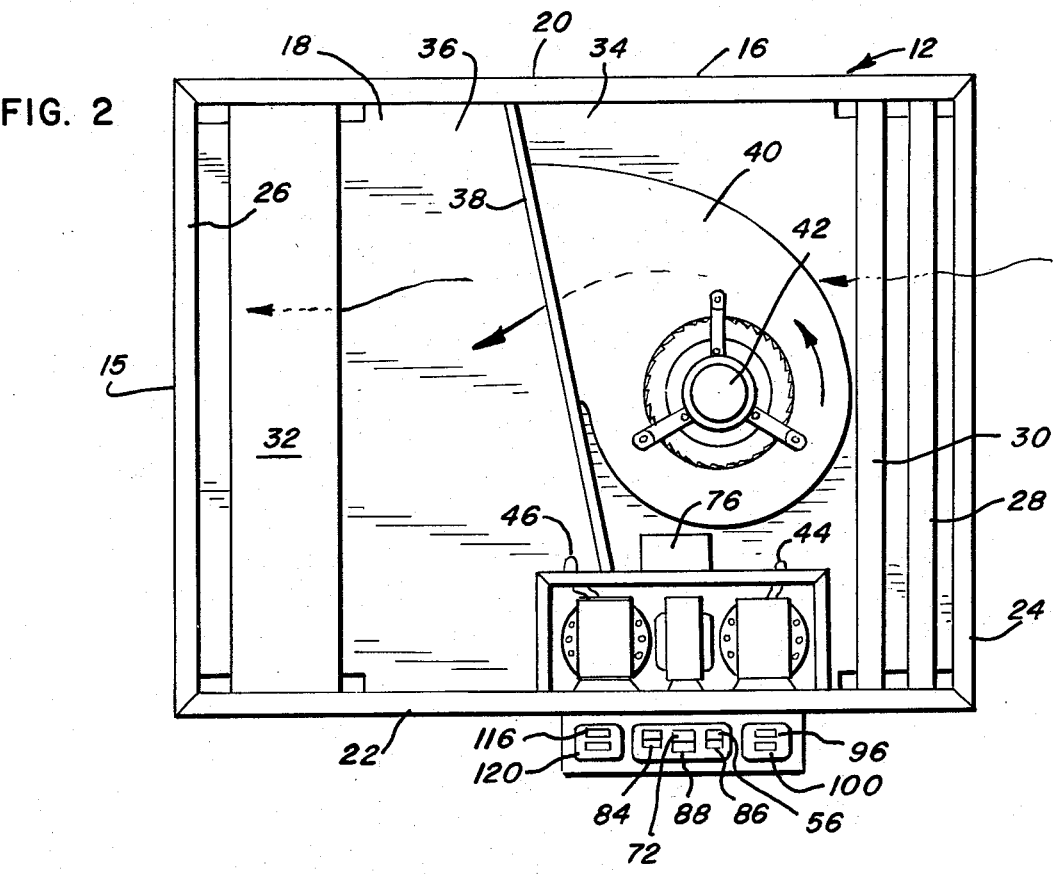
FIG. 2 is a front elevation view of one of the apparatuses of FIG. 1, showing the prefilter, the final filter, the means dividing the chamber between the filters into two adjacent subchambers, and the blower means for blowing air from the inlet chamber to the outlet chamber.

The detailed construction of the preferred embodiment of air filtering apparatus 12 is illustrated in FIG. 2. This particular embodiment illustrated has a box-shaped cabinet 15. The cabinet includes an air-tight front panel 16 (which has been removed for illustration purposes in FIG. 2), an air-tight back panel 18, and air-tight top and bottom panels 20 and 22. The front panel is preferably provided with a hinge and lock or is otherwise removably attached to permit access to the cabinet interior. The cabinet is open at the ends 24 and 26, except, if desired, these ends may be covered with a screening material, such as a very open weave cloth, metal screening or even fixed or adjustable louvres offering little or no resistance to the passage of air therethrough. Air is thus permitted to circulate freely through the tubular cabinet, entering from the inlet end 24 and existing from the outlet end 26. At the inlet end of the cabinet, there is a first or prefilter means, which in the illustrated embodiment comprises two filter panels or elements 28 and 30, which are used to filter out large particulates and adsorb odors from the air. These prefilter panels will be more fully hereinafter described. At the outlet end 26 of the apparatus is a second or final filter means consisting of a single filter element 32 (also more fully hereinafter described) which filters the fine particles from the air so that the air which is exhausted from the apparatus has 95% or more of all particulates removed which are 0.3 of a micron or larger.

The chamber formed between the first or prefilter means 28-30 and the second or final filter means 32 is divided into two subchambers 34 and 36 by means of a partition or wall 38. The wall 38 has an opening through which air may pass from the inlet subchamber 34 to the outlet subchamber 36, and across the opening in the partition 38 is mounted a blower 40, operated by means of an electric motor 42. The blower 40 serves to pump air through the opening in the partition 38 so that the air will be drawn in through the first subchamber 34 and will be forced through the opening in the partition 38 into the second subchamber 36 and exhausted through the second filter means 32.

The prefilter means 28–30 may consist of one or more prefilter elements or panels. In the illustrated embodiment, the two prefilter panel 28 and 30 are utilized. Panel 28 is used to filter large particulates such as street and house dust, lint, and other particulates, which constitutes approximately 90% by weight of all the particulates found in the average indoor or outdoor air. This inexpensive filter may be constructed of spun fiberglass or other synthetic material and is of the type found in conventional furnaces, and it is preferably impregnated with a conventional sticky viscous substance which greatly increases its efficiency.

The second prefilter element 30 is preferably an activated charcoal type of filter specifically designed to absorb odors out of the air passing through it. This filter is not principally used to filter particulates, but rather services principally to remove (by adsorption) over 300 types of odors. If desired, a second spun fiberglass type prefilter element may be employed, either in addition to or in place of the activated charcoal filter, although it has been found that a single spun fiberglass prefilter will work quite satisfactorily, particularly if it is treated with the sticky viscous substance to aid in the adherence of particulates thereto.

The final filter panel 32 employs a HEPA type filter medium, HEPA being the acronym for High Efficiency Particulate Airfilter. This type of filter developed by the U.S. Army Chemical Corps and covered by Federal Standard 209 and Military Standard 282 (See also U.S. Pat. No. 3,498,032). This filter is a glass asbestos membrane having intimately distributed pores capable of filtering from the air passing therethrough extremely large volumes of dust particles submicron in size, thus thoroughly cleansing the air. This type of filter is so fine that in the highest efficiency models (i.e. 99.97% efficiency) it is known in the industry and the medical profession as the "absolute" filter. The filter panel 32 is of the same construction but is rated at a slightly lower efficiency, which is quite adequate for room air filtering purposes. This filter is approximately six inches thick and has an amazing capacity for trapping and holding 95% of all particulates as small as 0.3 micron in size (DOP test). This is the size of a high percentage of particulates in tobacco smoke, for example. When this filter is used in conjunction with an efficient prefilter, it has a very long useful life span before it must be replaced. Usually the prefilter must be replaced many times before it is necessary to replace the HEPA type filter. One manufacturer of this type of filter is Cambridge Filter Corp. of Syracuse, N.Y.

In any type of air filtering appliance, the maintenance, or replacement, of the filter elements presents one of the biggest problems. Although the filters may be replaced at regular intervals, a user who maintains a regular periodic maintenance schedule is a rarity. In the air filtering apparatus herein described, there are two types of filter elements, the prefilter, which filters out the relatively large particulates, and the final, or HEPA type, filter element, which filters out the relatively small particulates. These two types of filter elements tend to accumulate particulate matter at different rates depending upon both the amount and the type of particulates in the air entering the apparatus, and therefore these elements would require changing at different intervals of time. If, for example, the air contains an abundance of large particulate matter, such as household dust, the prefilter elements will require changing more often than normal, whereas if the air entering the apparatus contains relatively small size particulates, such as in tobacco smoke, the accumulation on the HEPA type filter would be at a much higher rate, and this filter would require changing more often. It would therefore be extremely difficult to arrive at a satisfactory maintenance schedule based solely upon the amount of time that the filters were in place or the amount of time that the unit was actually on filtering the air.

One of the features of the present invention is the provision of means for separately, independently and yet simultaneously monitoring the condition of each of the two distinctly different types of filter elements in the two stage filtering system, i.e. a system having a prefilter and a final filter, with the air being filtered passing sequentially through both of these in the filtering operation.

Applicant has found that by partitioning the chamber between the first and second filter means into two subchambers and placing a blower between these filter means to pump air from one subchamber 34 into the adjacent subchamber 36, two different pressure conditions are made to exist in the subchambers. In the inlet, or first, subchamber 34, there is created a condition of negative pressure, or partial vacuum, whereas in the outlet, or second, subchamber 36, there is created a positive pressure. When a spun fiberglass filter 28 and charcoal filter 32 are employed as the first filter means of the system, as in the illustrated embodiment, the pressure condition within the first subchamber 34 is initially less than 0.1 inches water column of pressure below atmospheric. When the second filter means 32 is a HEPA type filter, as in the illustrated embodiment, there is created in the outlet subchamber 36 a condition of positive pressure of on the order of 0.4 inches water column of pressure above atmospheric. It has further been found that the accumulation of particulate matter on the first filter elements 28 and 30 (filter 30 being principally an adsorption filter) will result in a direct, proportionate and predictable increase in the negative pressure within the inlet chamber 34. In the same manner, the accumulation of particulate matter on the HEPA type filter 32 will result in a direct, proportionate and predictable increase in the positive pressure within the outlet chamber 36. Surprisingly enough, however, it has been found that the accumulation of particulate matter on the prefilter elements 28 and 30 will have relatively insignificant effect on the pressure generated by the blower 40 in the outlet chamber 36. Also, the accumulation of particulate matter on the HEPA type filter 32 will have relatively insignificant effect upon the pressure within the inlet chamber 34. It has actually been found that the blower motor 42 tends to speed up when there is a buildup of positive pressure in subchamber 36.

The present invention utilizes this phenomenon in providing a novel means of continuously and independently monitoring the condition of each of the two filter means in the air filtering apparatus of this invention. As schematically illustrated in FIG. 2, there is provided within the inlet subchamber 34 a first indicator means 44, which is responsive to a predetermined decrease in pressure (below atmospheric) in this subchamber for indicating when the prefilter or first filter means, i.e. the particulate filter element 28 of the prefilter, has accumulated sufficient particulate matter thereon to require changing. In the second or outlet subchamber 36, there is provided a second indicator means 46 responsive to a predetermined increase in pressure (above atmospheric) in that subchamber indicating when the second or HEPA type filter means require changing. The first indicator means 44 is preferably set for response to a decrease of pressure in the first subchamber 34 to approximately 0.4 water column inches below atmospheric, and second indicator means 46 is set for response to an increase of pressure in the second subchamber 36 to approximately 1.0 water column inches. At these levels the rate of air passing through the apparatus will have gradually decreased, but it is still acceptable for operation under design conditions. For example, the air will be forced through the apparatus at the rate of between 300 and 400 CFM with clean filter elements. At the pressure levels of response of the two indicator means, the flow rate will have been gradually reduced to from between 33 to 50% to about 200 CFM, and thereafter the rate begins to drop rapidly. Thus, the aforementioned pressure levels are important in maintaining proper operation of the apparatus. The indicator means 44 and 46 are thus warning indicators that the apparatus has reached a degree of efficiency at which a change in the filter elements is recommended if continued efficiency is desired.

The conditions of the first and second filter means may be thus simultaneously monitored by the first and second indicator means 44 and 46. In the present embodiment, each of the indicator means 44 and 46 includes a diaphragm-operated pressure switch, which controls a circuit having indicator elements such as warning lights to indicate when the respective filters require changing.

Figure 3:
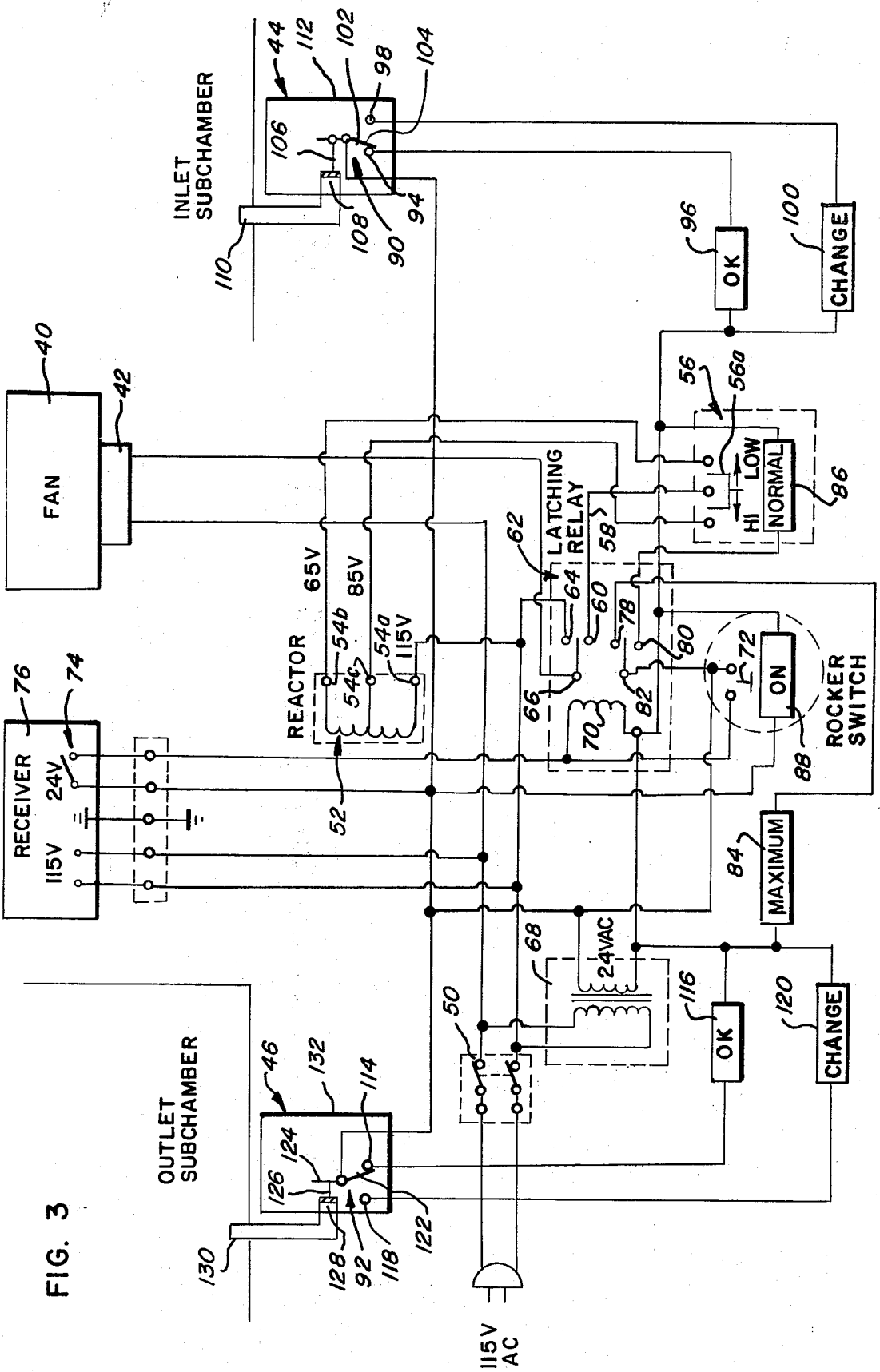
FIG. 3 is a schematic electrical diagram of the apparatus of FIG. 2.

In FIG. 3, there is illustrated the wiring diagram for the apparatus. The air filtering apparatus is operated by means of a 115-volt A.C. line through an on-off switch 50. The 115-volt line provides the voltage to operate the motor 42 of the blower 40 at a predetermined speed. The motor 42 is preferably a squirrel cage motor, so that by varying the voltage applied to the motor, the speed of the motor may be varied. For this purpose, the electrical system of the apparatus incorporates a voltage supply circuit providing, in addition to the 115-volt line voltages, two alternative lower voltages. The lower voltages are provided by means of a reactor 52 which may comprise a coil having a line voltage input terminal 54a, a low voltage output terminal 54b at the opposite end of the coil, and a center tap intermediate voltage output terminal 54c. In this particular embodiment, the voltage is decreased to 65 volts, which is the output at the low voltage terminal 54b. At the center terminal 54c, the intermediate voltage is 85 volts. Thus, there are provided three alternative voltages for operating the blower motor 42 at three alternative speeds.

The 85-volt and 65-volt output from the reactor 52 are led to a single pole, double throw switch 56, having a sliding contact 56a, which is manually movable between two alternative positions to apply the selected one of these lower voltages to an output line 58 leading to a lower voltage fixed switch contact 60 of one switch section of a latching relay 62. The other fixed switch contact 64 of that switch portion of the latching relay 62 is connected to the 115-volt A.C. line, and the movable contact 66 of that switch portion is connected to the blower motor 42. Thus, when the movable contact 66 is moved upwardly into engagement with the fixed contact 64, 115 volts will be applied to the blower motor 42, and when the movable contact 66 is moved downwardly into engagement with the lower voltage fixed contact 60 of that switch portion of the latching relay 62, one of the two aforementioned lower voltages will be applied to the blower motor 42. The lower voltage to be applied to the blower motor 42 when the movable contact 66 is in engagement with the lower voltage fixed switch contact 60 is dependent upon the position of the sliding contact 56a of the switch 56. In one position of the switch 56, the 65 volts from the low voltage output terminal 54b of the reactor 52 will be applied to the lower voltage terminal 60 of the latching relay. In the other position of the switch 56, the 85-volt output from intermediate voltage terminal 54c of the reactor will be applied to the lower voltage terminal 60 of the latching relay. Thus, the switch 56 governs the amount of lower voltage which is applied to the fixed contact 60, and the movable contact 66 determines whether the selected lower voltage or the voltage from the 115-volt line is to be applied to the blower motor 42. In some models, the above-mentioned voltage changing mechanism may be a sequential relay which will allow a choice of up to 12 different voltages, all controlled either manually at each apparatus or remotely by the method previously described.

A separate low-voltage operating circuit is provided for operating the latching relay 62, the blower speed indicating means, and the first and second filter element condition indicator means 44 and 46. A transformer 68 is employed to step the line voltage down to 24 volts A.C. This low voltage is applied to a control circuit including the switch-operating relay 70 of the latching relay 62. Also in this control circuit is a rocker switch 72 and a remote control switch 74. The switches 72 and 74 are so arranged that when either is closed momentarily, the relay coil 70 will be energized by a 24-volt "signal" applied thereto. The remote control switch 74 is operated by means of a radio receiver 76 which, upon receipt of a predetermined transmitted radio frequency signal, will amplify that signal and operate a relay to close the switch 74. This particular type of receiver 76 is a conventional relay operating radio receiver and may be of the type commonly utilized in the operation of automatic garage door opening and closing mechanisms.

Also contained in the latching relay 62 is the second switch portion consisting of a fixed contact 78, a fixed contact 80, and a movable contact 82. This switch portion together with two indicator lights 84 and 86 constitute the blower speed indicating means for the apparatus. The movable contact 82 is linked to and movable with the movable contact 66 of the upper switch portion of the latching relay, and is effective for operating the indicator lights 84 and 86. When the movable contact is moved upwardly into engagement with the terminal 78, the indicator light 84 will be energized, and when the movable contact 82 is in engagement with the lower contact 80, the indicator light 86 will be energized. As a result of the linkage of the movable contacts 66 and 82 of the two switch portions in the latching relay 62, the indicator light 86 will be energized when the movable contacts are in their low position, i.e. when the upper switch portion is applying the lower voltage to the blower motor 42, and the indicator light 84 will be energized when the movable contacts 66 and 82 are in their upward position when 115 volts A.C. is being applied to the blower motor 42. The latching relay is so designed that when the relay coil 70 is energized, the movable contacts 66 and 82 will move from one position in engagement with one set of contacts to the opposite position in engagement with the other set of contacts, and these contacts will remain latched in this position until the relay coil 70 is again energized.

The relay coil 70 thus serves as a control means responsive to a signal in the form of the momentary closure of the 24-volt circuit for moving the movable contacts of the latching relay switch portions from one position to the other, thereby changing the voltage applied to the blower motor 42, and indicating the change on the indicator lights 84 and 86.

An indicator light 88 connected in parallel across the 24-volt A.C. low voltage line is energized whenever the 24-volt A.C. circuit is energized, i.e. whenever the on-off switch 50 is closed. The light 88 thus indicates when the apparatus is turned on.

The first and second filter condition indicator means 44 and 46 are controlled by means of diaphragm-operated pressure switches 90 and 92, respectively, as schematically illustrated in FIG. 3. The pressure switch 90 has a first fixed contact 94 connected to a first indicator light 96, and the pressure switch has a second fixed contact 98 connected to a second indicator light 100. A movable contact 102 in the pressure switch 90 may have an operating arm 104 which is connected by suitable linkage 106 to a flexible diaphragm 108 mounted in one end of a tube 110. The opposite end of the tube 110 opens into the first subchamber 34 of the air filtering apparatus. The other side of the diaphragm 108 is open to the atmosphere through an opening 112 in the wall of the pressure switch housing. Thus, when the pressure within the subchamber 34 is lowered with respect to atmospheric, the diaphragm 108 will move to the left (as viewed in FIG. 3), pulling the operating lever 104 of the movable contact to the left, and swinging the movable contact from engagement with the fixed contact 94, and into engagement with the second fixed contact 98. This will cause the indicator lamp 96 to go out, and the indicator light 100 to be energized, indicating that the first filter means, consisting of the filter panels 28 and 30, require changing.

The pressure switch 92 of the second filter condition indicator means 46 may be similarly constructed. This pressure switch has a fixed contact 114 connected to an indicator light 116 and a second fixed contact 118 connected to a second indicator light 120. The movable contact 122 of the pressure switch 92 has an operating arm 124 which is connected by suitable linkage 126 to the diaphragm 128, mounted at the end of the tube 130. The other end of the tube 130 extends into the subchamber 36 of the air filtering apparatus, and the inside end of the diaphragm 128 is open to the atmosphere through an opening 132 in the side wall of the pressure switch housing. Thus, when the pressure within the subchamber 36 raises above a predetermined level above atmospheric, the diaphragm 128 will be pushed to the right (as indicated in FIG. 3), moving the operating arm 124 and the movable contact 122 in the clockwise direction, and from a position of engagement with the fixed contact 114 to a position of engagement with the fixed contact 118. Thus, the indicator light 116, which was energized when the fixed contact 114 was in engagement with the movable contact 122, will be de-energized, and the indicator light 120 will be energized to indicate that the HEPA type filter 32 has accumulated a sufficient amount of particulates to recommend changing.

Each of the filtering apparatuses 12a and 12b (as illustrated in FIG. 1) are identically constructed. The receiver 76 of each such apparatus is designed to receive and close the switch 74 only upon receipt of a single transmitted radio signal from the transmitter 14 to control the speed of the blower motor 42. When the blower motor is operating at its highest speed, the pressure conditions in the subchambers 34 and 36 will be most severe, and thus the condition of the first and second filter means can best be determined during this operation. The blower motor may be operated continually at its highest speed, if desired, and in a room which has much tobacco smoke or other particulates in the air, this may be a highly desirable mode of operation. A slower and more quiet operation of the blower, however, may be achieved by the operation at the lower speed. This speed regulation may be accomplished either by remote control from the transmitter 14 to the receiver 76 which closes the remote control switch 74, or it may be accomplished by manual operation of the rocker switch 72. The "normal" speed of the motor may be further regulated manually by the switch 56, which can switch alternately from the 85-volt output to the 65-volt output of the reactor 52. The indicator lights 84 and 86 will indicate whether the motor is operating at its high or one of the lower speeds. Usually, the blower will be operating at one of the lower speeds and, if a check of the condition of the filter elements is desired, this may be remotely controlled to instantaneously check the condition of the filters. This remote control of one or more filtering apparatuses to control the speed of the blowers in the various apparatuses greatly facilitates the operation and maintenance of the filter system, whether that system comprises one or several of the air filtering apparatuses.

It will be understood that the foregoing description has been given only by way of example and that various changes and modifications of the apparatus may be undertaken without departing from the spirit and scope of the invention as defined by the appended claims.

What is claimed is:

1. An air filtering apparatus comprising a chamber having an inlet and an outlet, a prefilter panel disposed across said chamber inlet, a HEPA type filter panel disposed across said chamber outlet, dividing means intermediate said prefilter panel and said HEPA type filter panel for dividing said chamber into adjacent first and second subchambers, said dividing means having an opening through which air may pass from said first subchamber into said second subchamber, blower means intermediate said prefilter panel and said HEPA type filter panel for forcibly blowing air from said first subchamber through said dividing means opening and into said second subchamber, whereby air will be drawn through said prefilter panel into said first subchamber and will be forced into said second subchamber and exhausted through said HEPA type filter panel, pressure responsive indicator means responsive to a predetermined increase in pressure in said second subchamber for indicating when said HEPA type filter panel requires changing, said blower means including an electric blower motor, the speed of which may be varied by varying the voltage applied thereto, a voltage supply circuit, and means for varying the voltage applied by said circuit to said blower means, said voltage varying means including switch means connected to said voltage supply circuit and operable in two alternative positions for supplying two alternative voltages for operation of said blower motor at two alternate speeds, one of which is sufficient to generate pressure conditions within said second subchamber sufficient to actuate said pressure responsive means if the HEPA type filter panel requires changing, control means responsive to a predetermined signal for effecting movement of said switch means from one of said alternative positions to the other, signal applying means operatively connected to said control means for applying an actuating signal to said control means, said signal applying means including radio frequency receiver and signal circuit means operated by said receiver in response to receipt of a predetermined transmitted frequency for applying an actuating signal to said control means, and means for generating the predetermined radio frequency for actuating said radio receiver, whereby said blower means may be remotely controlled to test the condition of said HEPA filter panel.

2. The apparatus of claim 1 wherein said first filter means includes a spun fiberglass mat prefilter panel.

3. The apparatus of claim 1 wherein said first filter means also includes a panel of an odor adsorptive material.

4. The structure of claim 1 wherein said voltage supply circuit further includes means for varying the lower one of the two alternative voltages, whereby the normal operating speed of the blower means may be further regulated.

5. The structure of claim 1 wherein there are provided a plurality of air filtering apparatuses, the radio receiver of each being responsive to a single predetermined transmitted radio signal, whereby the conditions of the filter means in each apparatus may be simultaneously checked by a single radio frequency generating means.

6. The structure of claim 1 and further including a prefilter indicator means in said first chamber for indicating when said prefilter requires changing.

7. The apparatus of claim 1 wherein said pressure responsive indicator means comprises a switch having a pressure responsive contact movable in response to pressure within the corresponding subchamber from a first position to energize a first indicator element and a second position to energize a second indicator element.

8. The apparatus of claim 1 wherein the flow characteristics of said first and second filter means and the air pumping characteristics of said blower means are such as to provide less than 0.1 inches water column of pressure below atmospheric in said first subchamber and approximately 0.4 inches water column above atmospheric in said second subchamber and said pressure responsive indicator means is responsive to an increase in positive pressure above atmospheric of approximately 1.0 inches water column, indicating that there has been such a change in the flow characteristics of the HEPA type filter panel as to require replacement of that filter means.

* * * * *